United States Patent [19]

Orton

[11] Patent Number: 5,448,060
[45] Date of Patent: Sep. 5, 1995

[54] MEASURING SYSTEM FOR DETERMINING TRANSVERSE DEFLECTION OF A ROTARY SHAFT

[76] Inventor: Paul A. Orton, 33 Farm Rd., Beeston, England, NG9 5BZ

[21] Appl. No.: 146,047
[22] PCT Filed: May 5, 1992
[86] PCT No.: PCT/GB92/00811
  § 371 Date: Jan. 14, 1994
  § 102(e) Date: Jan. 14, 1994
[87] PCT Pub. No.: WO92/19936
  PCT Pub. Date: Nov. 12, 1992

[30] Foreign Application Priority Data
  May 2, 1991 [GB] United Kingdom .................. 9109501

[51] Int. Cl.⁶ ............................................. G01D 5/34
[52] U.S. Cl. ........................... 250/231.16; 250/237 G; 356/358
[58] Field of Search ...................... 250/231.14, 231.16, 250/231.18, 237 G; 356/356, 354, 358; 341/13, 14

[56] References Cited

U.S. PATENT DOCUMENTS

| | | | |
|---|---|---|---|
| 4,547,667 | 10/1985 | Sasaki et al. | 250/231.16 |
| 5,036,192 | 7/1991 | Ishizuka et al. | 250/231.16 |
| 5,101,102 | 3/1992 | Nishimura et al. | 250/231.16 |

*Primary Examiner*—David C. Nelms
*Assistant Examiner*—Que T. Le
*Attorney, Agent, or Firm*—Brooks & Kushman

[57] ABSTRACT

A known method of measuring angular displacement of a shaft (11) using an optical grating mounted for rotation with the shaft is applied at two or more angularly spaced locations (16, 17 and 18) and the resulting measurements are process to produce a measurement of relative displacement of the shaft in a direction transverse to the shaft. Two locations are needed to measure displacement in a given direction. Three or more locations are necessary to provide full information about the displacement of the shaft.

5 Claims, 4 Drawing Sheets

MEASURING SYSTEM FOR DETERMINING TRANSVERSE DEFLECTION OF A ROTARY SHAFT

FIELD OF THE INVENTION

This invention relates to a system for measuring relative displacements of a rotating shaft in a direction transverse to the axis of the shaft.

BACKGROUND OF THE INVENTION

Displacements of a shaft axis occur at frequencies comparable to or greater than the frequency of rotation of the shaft in many machines and apparatus. A shaft which supports a grinding wheel in a grinding machine is subject to such displacement both as a result of imbalance of the rotating masses and as a result of external forces applied to the grinding wheel when it engages a workpiece.

One known method of measuring displacement uses a probe to mechanically follow he shaft and a transducer to measure the displacement of the probe. For complete information two probes at right angles are required.

The present invention uses a known method of measuring angular displacement of a shaft. The method is applied at two or more angularly spaced locations and the resulting measurements are processed to produce a measurement of relative displacement of the shaft in the required transverse direction. Two locations are needed to measure displacement in a given direction. Three or more locations are necessary to provide full information about the displacement of the shaft.

SUMMARY OF THE INVENTION

According to the invention a displacement measuring system for indicating relative displacement of a shaft transverse to its axis, comprises:
   a) a first detector at a first station for producing electrical signals in a first channel representative of angular displacement of the shaft as measured at the first station;
   b) a second detector at a second station angularly spaced from the first station for producing electrical signals in a second channel representative of angular displacement of the shaft as measured at the second station;
   c) means for processing information from the first and second channels to generate an indication of relative displacement between the detectors and the shaft in a direction transverse to the axis of the shaft.

It is an important advantage of the invention that the shaft displacement information is obtained from angular position detecting devices so that full information as to shaft angular motion and transverse displacement can be derived without using two separate measuring systems.

BRIEF DESCRIPTION OF THE DRAWINGS

The invention will now be described with reference to specific embodiments shown in the accompanying drawings in which.

DETAILED DESCRIPTION OF THE PREFERRED EMBODIMENTS

The shaft displacement measuring system of the invention is an instrument for measuring the relative displacement of a rotating shaft in directions transverse to the axis of rotation of the shaft. In its simplest form (FIG. 2) the shaft displacement measuring system is capable only of measuring displacements in a single direction.

Figure 1:
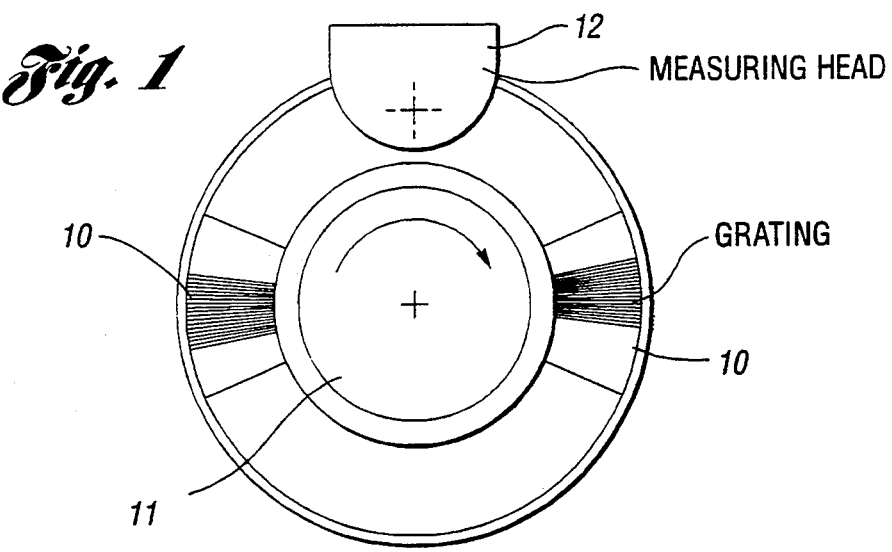
FIG. 1 shows a known form of optical shaft encoder.

The shaft displacement measuring system uses optical shaft encoders of a known kind which produce as output an electrical signal comprising a train of pulses of frequency proportional to the angular velocity of the shaft. As shown in FIG. 1, an encoder of this kind comprises a transparent disc 10 arranged for rotation with the shaft 11 from which measurements are required to be taken. A measuring head 12 mounted on a fixed base (not shown) comprises a light source on one side of the disc 10 projecting a beam of light onto a light sensitive semi-conductor device on the other side of the disc.

A radial optical grating on the disc interrupts the beam as the shaft rotates. The output signal from the measuring head 12 comprises a train of pulses, each pulse corresponding to the passage of a space in the grating past the beam.

Normally such encoders are used to measure angular position and speed only. Motion of the disc relative to the shaft axis is considered a source of error when estimating angular position. For this reason optical shaft encoders have their own precision bearings independent of the bearings of the shaft to be measured and the disc is driven by a bellows coupling which isolates the encoder from shaft vibrations.

In the shaft displacement measuring system of the invention the disc 10 is fixed to the shaft 11 and two diametrically opposed measuring heads 14 and 15 are fixed to the base of the apparatus in which the shaft 11 is journalled.

The output signals from measuring heads 14 and 15 are processed in a manner to be described in more detail below in relation to the embodiment of FIG. 3 to develop a succession of pairs of angular position measurements. These angular position measurements are processed in a data processor (not shown) which may be a general purpose computer which derives the displacement of the shaft from the relationship illustrated in FIG. 4. If l is the distance between the two measuring stations and $\theta$ is the difference between the angular position of the shaft measured at the first station and the angular position of the shaft measured at the second station, the displacement of the shaft from a line joining the two measuring stations is given by:

$$\text{Displacement} = (\pi - \theta) * \tfrac{1}{2} \quad (1)$$

Figure 2:
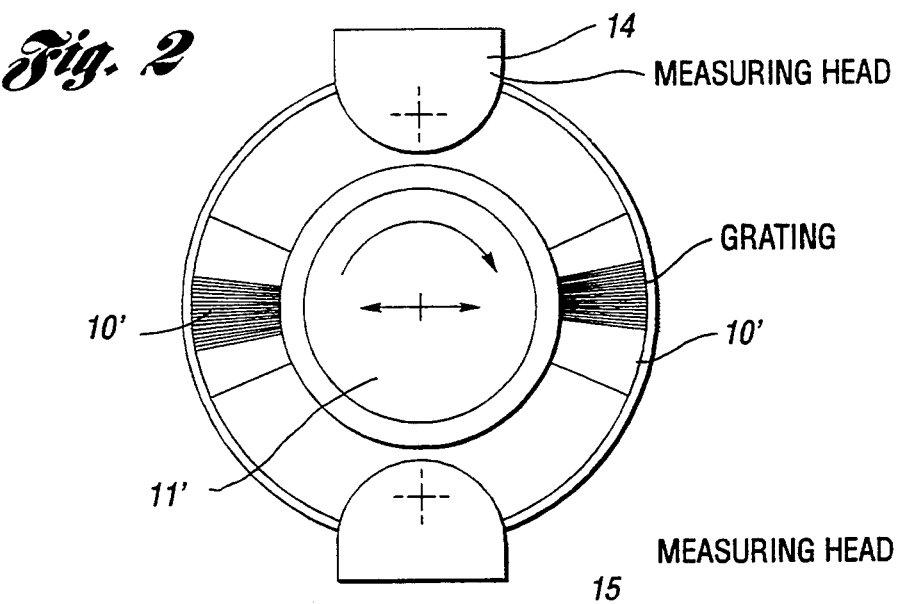
FIG. 2 shows an embodiment of the invention having two measuring heads spaced at 180° approximately and able to measure shaft displacement in a direction transverse to the diameter joining the measuring heads.
Figure 4:
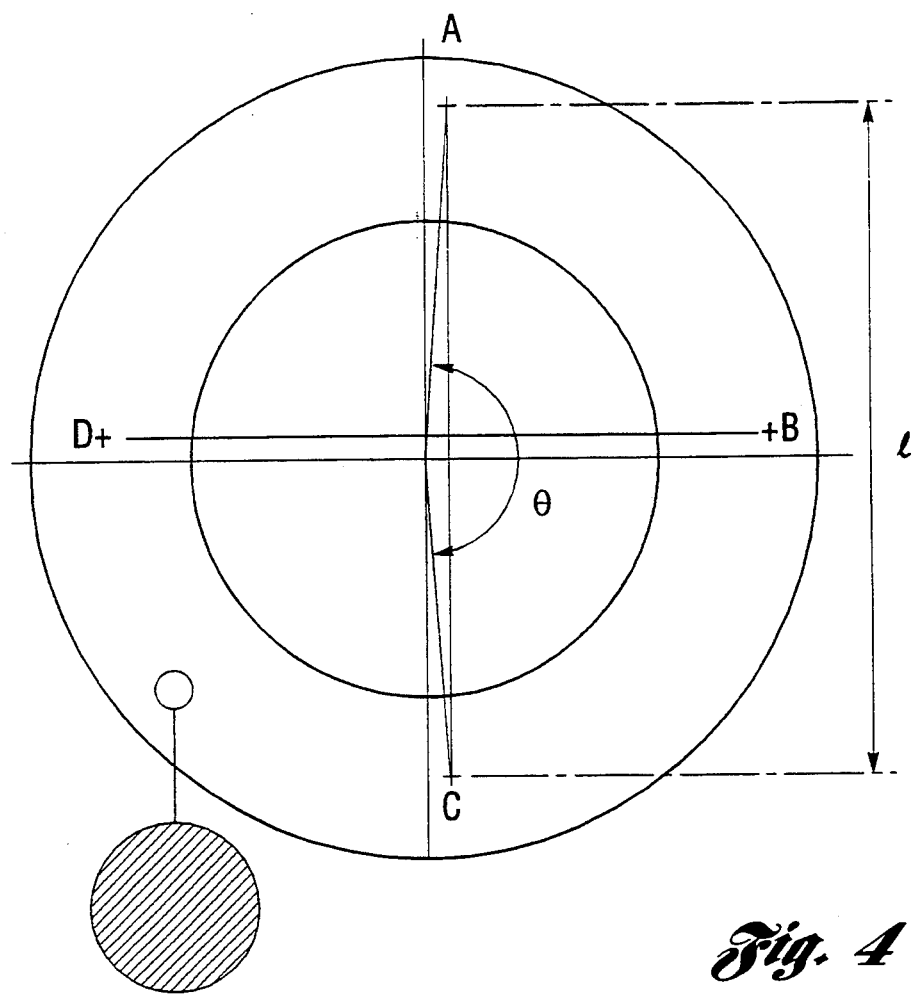
FIG. 4 shows how shaft displacement is derived from the measurements made in the embodiment of FIG. 2.

The operation of the embodiment of FIG. 2 can be understood by reference to FIG. 4. Assume initially that the shaft centre-line is in line with the two measuring heads. In this case the angular position measurement derived from the signal from the first station will be exactly π radians different from the angular position measurement derived from the signal from the second station. Using the formula given above, the data processor will indicate zero displacement. If the shaft remains in the same position the processor will receive a succession of pairs of angular position measurements with a π radians difference.

Upon displacement of the shaft to the left as viewed in FIG. 4 the difference between the pairs of angular position measurements will decrease and the displacement of the shaft will be given by formula (1) above.

It will be appreciated that the two head system of FIG. 2 can only measure displacement perpendicular to the diameter on which the heads are positioned, that is horizontally as shown in FIG. 4. To measure vertical displacement, two additional heads at opposite ends of a horizontal diameter could be used. It is more economical to use three heads 16, 17 and 18 spaced apart 60° as shown in FIG. 3

The time of passage of individual grating lines does not enable angular position to be measured with sufficient accuracy for many applications. A system which provides for interpolation between successive grating lines and measurement of angular position to an accuracy much greater than the angle between adjacent grating lines will now be described with reference to the embodiment shown in FIGS. 3, 5 and 6.

Figure 3:
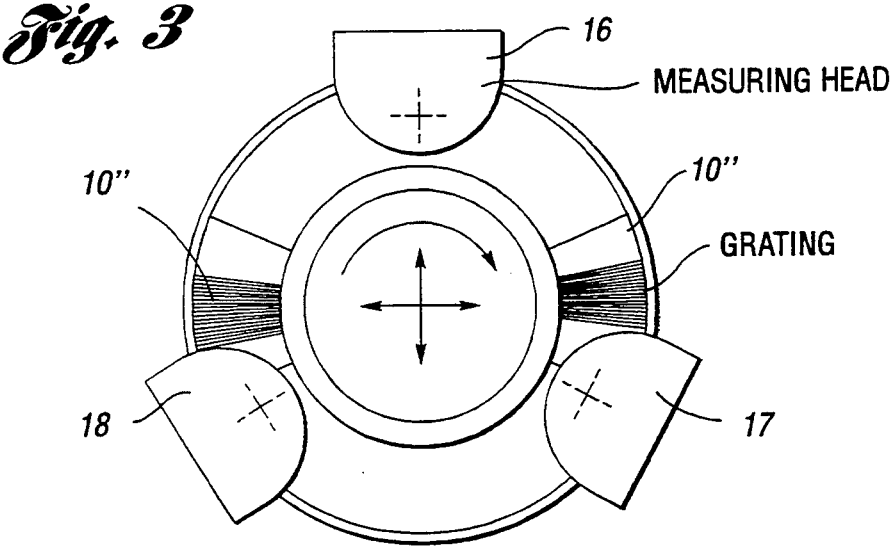
FIG. 3 shows a second embodiment in which three measuring heads spaced at angular intervals of approximately 60° are used for measuring shaft displacements in any direction transverse to the axis of the shaft.
Figure 6:
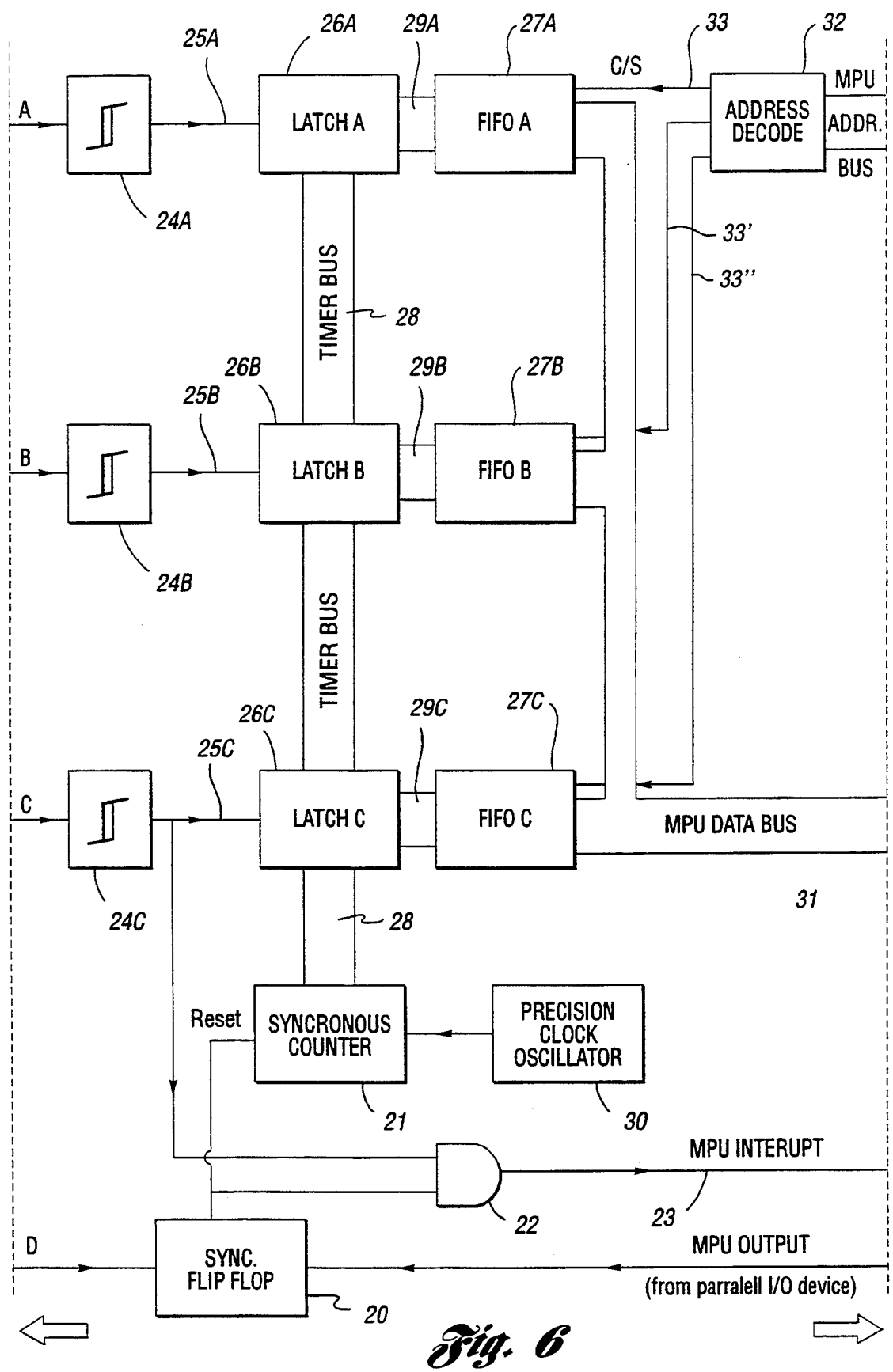
FIG. 6 is a block diagram of the circuit through which the output signals of the three measuring heads in the embodiment of FIG. 3 are processed to provide signal suitable for computer analysis.

Referring to FIG. 6, an interface circuit for connecting the output of measuring heads A, B, and C, indicated respectively by reference numerals 16, 17 and 18 in FIG. 3 to a general purpose computer (not shown), comprises three channels A, B and C plus an additional channel D for collecting a once per revolution synchronization signal. The synchronisation signal may be produced by the passage of a single grating line on the disc 10 past by an additional head (not shown) at a different distance from the shaft axis than the main measuring heads A, B and C. The signal in channel D thus provides a reference pulse corresponding to a specific angular position of the shaft. This pulse on line D sets a flip-flop used for resetting a counter 21 and for sending an interrupt via OR gate 22 and interrupt line 23 to the computer.

Channels A, B and C comprise respectively a Schmitt Trigger 24A, 24B and 24C which convert the pulses from the respective photo-sensitive semiconductor device into a square wave on lines 25A, 25B and 25C connect to a latch 26. Each latches 26A, 26B and 26C is connected by a bus 29A, 29B or 29C to a FIFO (first in first out) buffer, shown at 27A, 27B or 27C.

The latches 26 are connected by a timer bus 28 to the synchronous counter 21. The counter 21 counts pulses from a precision clock gate 30.

All three FIFO buffers are connected to the data bus 31 and to the Address Decoder 32 of the computer.

Line 25C is connected to one input of the OR circuit 22 so that in addition to the interrupt sent when the synchronising signal on line D is received, an interrupt is also sent to the computer once for each grating line.

These interrupts enable the computer to request the output of the buffers at intervals corresponding to the period between the passage of grating lines past the measuring heads by sending signals to the buffers on lines 33, 33' and 33'' via the address decoder 32.

In operation, the clock 30 runs continuously and each of its output pulses increments the counter 21. When the synchronising pulse on channel D sets the flip-flop 20, the counter 21 is set to zero.

After a delay dependent upon the angular position of the disc as seen at the three measuring points, pulses arrive at the latches from channels A, B and C. In each channel the count taken by the latch from timer bus 28 is transferred to the FIFO buffer at the instant the leading edge of the pulse on line 25a, 25B or 25C reaches the latch.

Sets of three counts are taken from the buffers 27A, 27B and 27C via data bus 31 under control of address decoder 32 for storage in table form in the computer for subsequent processing as described below. The interface circuit enables the computer to collect readings from which the shaft displacement will be calculated at the rate of one set per grating line.

The computer looks at a set of three readings, one from each channel. Each reading gives the time taken for the shaft to turn to the related angular position. Using an input for shaft angular velocity taken by counting the frequency of interrupts the computer converts the stored readings into angle information.

Figure 5:
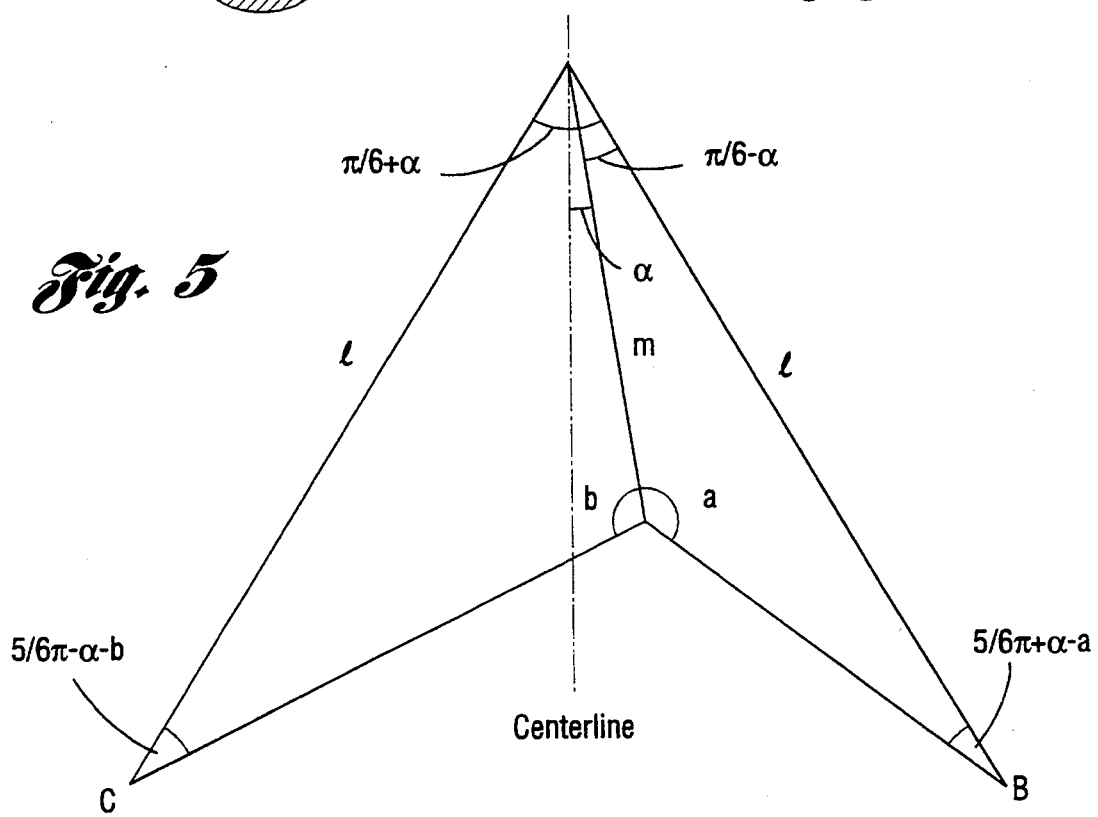
FIG. 5 shows how shaft displacement in a plane transverse to the axis of the shaft is derived from the measurements made in the three head embodiment of FIG. 3.

In FIG. 5, A, B, and C indicate the positions of the three measuring heads. These are spaced apart a distance 1 at the corners of an equilateral triangle. The position of the shaft axis relative to the measuring heads is given by its distance m from A and by the angle $\alpha$ between the vertical through A and a line joining the shaft axis to A. The computer stores sets of values for A, B and C which are the angular positions of the shaft as measured at A, B, and C expressed in the form of the angle through which the shaft has rotated since detection of the last synchronising pulse. It can be shown that:

$$\hat{a} = \hat{A} - \hat{B} \quad (2)$$

$$\text{and } \hat{b} = 2\pi - (\hat{A} - \hat{C}) \quad (3)$$

Using the sine formula for the two triangles shown in FIG. 5, it can be shown that for small angles $\alpha$:

$$\alpha = \frac{\sin a \sin(5\pi/6 - b) - \sin b \sin(5\pi/6 - a)}{\sin a \cos(5\pi/6 - b) + \sin b \cos(5\pi/6 - a)} \quad (4)$$

$$m = \frac{1 \sin(5\pi/6 + \alpha - a)}{\sin a} \quad (5)$$

Horizontal Displacement of the shaft from the centre of the measuring heads is approximately:

$$\alpha * m \quad (6)$$

Figure 7:
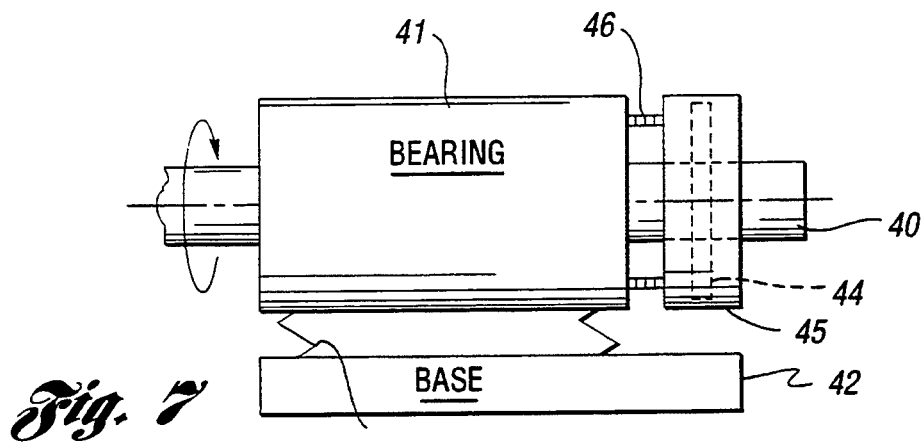
FIGS. 7 to 10 show applications of the shaft displacement measuring system of the invention.

FIG. 7 shows an application of the shaft displacement measuring system of the invention to the measurement of shaft lateral motion relative to its bearings. The shaft 40 is journalled in bearing mounted on a machine base 42 by flexible mountings 43. The disc with optical grating 44 is fixed to the shaft 40 and a platform 45 carrying the measuring heads is fixed to the bearing by solid mountings 46. The output from the computer gives information as to the vibration of the shaft relative to its bearing as it rotates.

Figure 8:
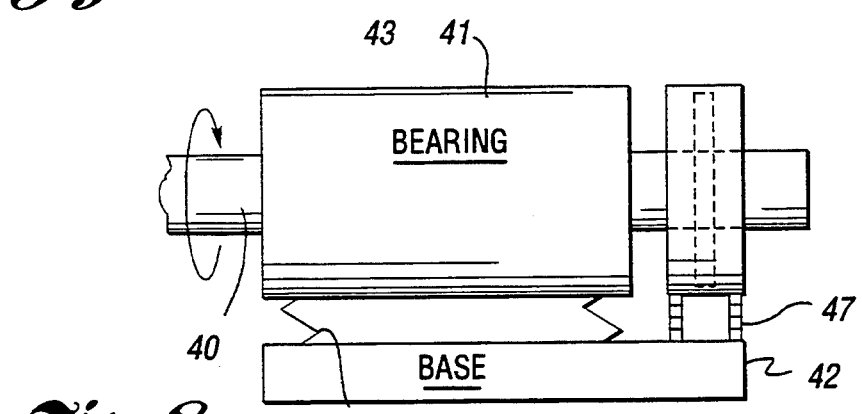

The set up shown in FIG. 8 differs from that shown in FIG. 7 in that the platform 45 is fixed to the base 42 by solid mountings 47 and so that the computer output indicates movement of the shaft and its bearing relative to the machine structure 42.

Figure 9:
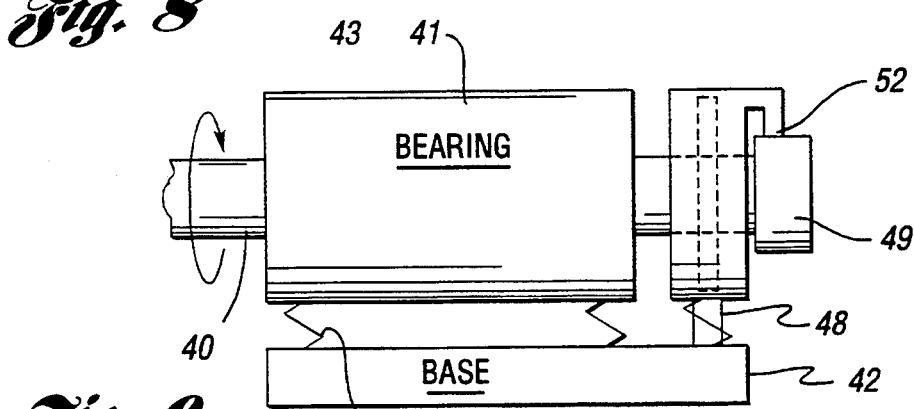
Figure 10:
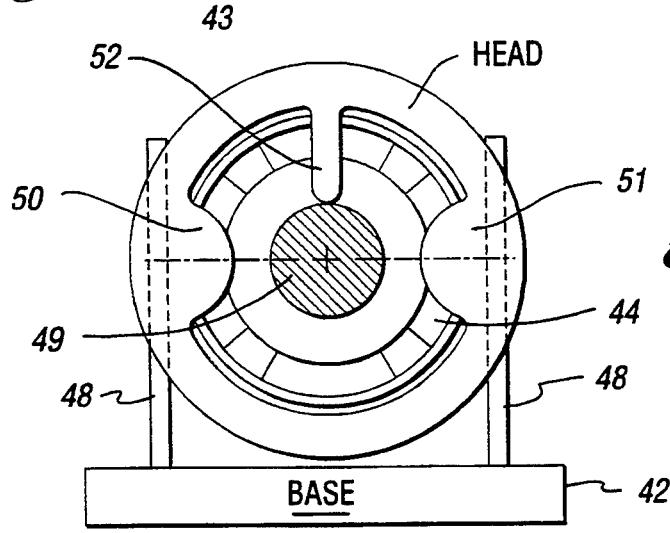

FIGS. 9 (side view) and FIG. 10 (end view) show how the shaft displacement measuring system can be used to gauge a component 49 fixed to the shaft 40. In this case, the measuring head platform is mounted for sliding movement relative to the machine base 42 on vertical guides 48 and a surface following probe 52 fixed to the platform ensures that the platform follows the contour of the component 49. Since only vertical movement is involved, two measuring heads 50 and 51 are sufficient. It should be noted that in this example the shaft remains fixed and the shaft displacement measuring system is measuring the movement of the platform relative to the shaft.

The shaft displacement measuring system may also be used for the control of automatic bearings such as hydrostatic bearings in which fluid pressure in angularly spaced bearing pockets is increased or decrease to maintain shaft clearance from the bearings within predetermined limits. The shaft displacement measuring system provides information which can be used to control fluid pressures within the system to maintain the required clearances.

Similarly, in an active magnet bearing, the output of the shaft displacement measuring system can be used to control current to electromagnetic bearings to maintain required air gaps between a shaft and the electromagnets with varying loads.

The disc 10 may be replaced by a drum with a reflective grating formed on its outer surface and the light sources and detectors outside the drum. Alternatively the drum could be transparent with the light sources on the inside and the detectors on the outside, or vice versa.

I claim:

1. A displacement measuring system for indicating relative displacement of a shaft transverse to its axis, comprising:
    a) a first detector at a first station for producing electrical signals in a first channel representative of angular displacement of said shaft measured at said first station;
    b) a second detector at a second station angularly spaced from said first station for producing electrical signals in a second channel representative of angular displacement of the shaft as measured at said second station; and
    c) means for processing information from said first and second channels to generate an indication of displacement of the axis of said shaft relative to said detectors in a direction transverse to the axis of the shaft, said displacement measuring system including a disk, an optical grating on said disk, said disk being mounted for rotation with said shaft, said grating having grating lines transversely disposed relative said shaft axis, each of said detectors comprising photosensitive means for producing electrical signals corresponding to the passage, said grating lines past the respective stations.

2. A displacement measuring system as claimed in claim 1 in which said detectors are at opposite sides of the shaft spaced about 180° apart and said processing means includes means for indicating displacement of the shaft in a direction at right angles to a line joining said detectors responsive to said signals.

3. A displacement measuring system as claimed in claim 1 including a third detector at a third station angularly spaced from said first and second stations, said third detector producing electrical signals representative of angular displacement of the shaft as measured at said third station, said processing means including means for generating an indication of the position of the shaft in a plane transverse to its axis responsive to said signals.

4. A displacement measuring system as claimed in claim 3 in which said first, second and third detectors are spaced apart approximately 120°.

5. A displacement measuring system as claimed in claim 4 including third and fourth detectors respectively at third and fourth stations and angularly spaced approximately 90° from said first and second stations and including means for producing electrical signals representative of angular displacement of the shaft as measured at the third and fourth stations, said processing means including means responsive to said signals for generating and indication of the position of the shaft in a direction at right angles to a line joining said detectors.

* * * * *